UNITED STATES PATENT OFFICE.

CHARLES J. O'DONNELL AND ALBERT F. KUNBERGER, OF PHILADELPHIA, PENNSYLVANIA, ASSIGNORS TO THE UNITED GAS IMPROVEMENT COMPANY, OF PHILADELPHIA, PENNSYLVANIA, A CORPORATION OF PENNSYLVANIA.

PROCESS OF PURIFYING GAS.

1,105,578. Specification of Letters Patent. Patented July 28, 1914.

No Drawing. Application filed April 18, 1913. Serial No. 761,880.

*To all whom it may concern:*

Be it known that we, CHARLES J. O'DONNELL and ALBERT F. KUNBERGER, both citizens of the United States, residing at Philadelphia, in the county of Philadelphia and State of Pennsylvania, have jointly invented a new and useful Process of Purifying Gas, of which the following is a specification.

The principal object of the present invention is to provide gas which shall be comparatively free from carbon bi-sulfid and therefore of different and purer quality which in connection with gas means of different composition than ordinary gas as heretofore made and supplied.

The elimination of carbon bi-sulfid like the elimination of other sulfur compounds such as hydrogen sulfid is advantageous because when gas containing sulfur or sulfur compounds is burned the ultimate result is the formation of sulfurous and sulfuric acids which are noxious and deleterious substances.

The present invention is based on the discovery that iron oxid having a certain kind of physical structure if utilized at an appropriate temperature will remove carbon bi-sulfid from gas in a practical manner and upon a commercial scale.

According to this invention the gas is purified and freed from carbon bi-sulfid, and by freed is meant that carbon bi-sulfid in deleterious quantities is removed, by passing it through ferric oxid of appropriate physical structure and at a proper temperature. This not only removes the carbon bi-sulfid, as has been said, but also removes sulfureted hydrogen if present in the gas. However, sulfureted hydrogen would ordinarily be removed prior to the removal of the carbon bi-sulfid by some well known method of purification at a lower temperature than is used for removing the carbon bi-sulfid in accordance with this invention.

The ferric oxid that accomplishes the above results is velvety or fluffy or voluminous. It may be described as a precipitate of yellow or ocher color having the probable formula $Fe_2O_3.n(H_2O)$ containing at least a half molecule of water and preferably more. The described hydrated ferric oxid is easily obtainable and is well known as a by-product, for example, it occurs as a by-product in the manufacture of alum from bauxite where the iron occurs as an impurity and is removed by precipitation.

Good results are obtained by heating the ferric oxid to a temperature of from 400° to 450° F., more or less, and keeping it at that temperature while the gas to be purified is passing through it. The gas may be passed through the described hydrated ferric oxid at the rate of 11,000 cubic feet per bushel of purifying material in twenty-four hours, more or less, and the capacity of the purifying material is very large, meaning that comparatively little of it will purify a large amount of gas.

The temperatures above given are not absolute but the temperature employed should be such that the purifying material while dry retains its water of formation and is at a temperature considerably above ordinary temperatures.

By the described invention it is evident that those coals or gas making substances, which because they produce gas containing excessive quantities of carbon bi-sulfid are now unfit for gas making purposes, can be used successfully for that purpose.

What we claim is:

1. The process of purifying gas which consists in removing carbon bi-sulfid by passing the gas through hot and dry ferric oxid, substantially as described.

2. The process of purifying gas which consists in removing carbon bi-sulfid by passing the gas through hot and dry previously precipitated hydrated ferric oxid, substantially as described.

3. The process of purifying gas which consists in removing carbon bi-sulfid by passing the gas through hot ferric oxid having the probable formula $Fe_2O_3.\frac{1}{2}(H_2O)$.

4. The process of purifying gas which consists in heating ferric oxid to substantially from 400° to 450° F. and passing the gas through the same, thereby removing carbon bi-sulfid.

5. The process of purifying gas which consists in heating yellow or ocher iron oxid and passing the gas through the same.

6. The process of purifying gas which consists in removing carbon bi-sulfid by passing the gas through hot and dry fluffy or voluminous ferric oxid.

In testimony whereof we have hereunto signed our names.

CHARLES J. O'DONNELL.
ALBERT F. KUNBERGER.

Witnesses:
G. Z. SCHUERS,
W. H. FULWEILER.